United States Patent [19]

Gilman

[11] 4,136,226

[45] Jan. 23, 1979

[54] IMPACT-ABSORBING LAMINATE AND METHOD OF MANUFACTURE THEREOF

[76] Inventor: Richard L. Gilman, Gilman, Conn. 06336

[21] Appl. No.: 889,243

[22] Filed: Mar. 23, 1978

[51] Int. Cl.² .............................................. B32B 3/26
[52] U.S. Cl. .................................. 428/315; 264/321; 428/119; 428/215; 428/321
[58] Field of Search ............... 264/321; 428/315, 310, 428/119, 213, 215, 320, 322

[56] References Cited

U.S. PATENT DOCUMENTS

| | | | |
|---|---|---|---|
| 3,317,363 | 5/1967 | Weber | 428/315 |
| 3,616,029 | 10/1971 | Lerman | 428/315 |
| 3,816,234 | 6/1974 | Winfield | 428/315 |
| 3,979,540 | 9/1976 | Moffett | 428/315 |
| 4,053,341 | 10/1977 | Kleiner et al. | 428/315 |

*Primary Examiner*—William J. Van Balen

[57] ABSTRACT

An impact-absorbing laminate is provided comprising a rigid support layer and an impact-absorbing foam layer fused to at least one surface of the support layer, the impact-absorbing foam layer having a relatively high density outer self-skin on the surface opposing the surface fused to the support layer, the foam and the support layer both being formed of ionomer. The method for manufacturing this impact-absorbing article, comprises the fusing of a resilient foam layer and a non-cellular, relativey rigid, polymer sheet by applying heat to the layers and maintaining the sheets at such elevated temperature, in contact, for a time sufficient to fuse the foam layer and sheet together. A relatively dense self-skin layer is formed on the surface of the foam opposite that in contact with the polymer layer. The ratio of the overall density of the final fused laminate to the unfused layers is most preferably less than about 1.25.

22 Claims, 3 Drawing Figures

IMPACT-ABSORBING LAMINATE AND METHOD OF MANUFACTURE THEREOF

The present invention relates to an improved impact-absorbing laminate which can be readily formed to a desired straight or curvilinear configuration preferably by an improved one-step process of the present invention.

Impact-absorbing devices of irregular cross-section and outer surface are commonly used to prevent injury to athletes, and individuals working in high-risk industries. For example, protective padding over various sensitive or easily injured portions of the body has been included in a variety of different athletic uniforms, including, for example, football uniforms, as well as in such devices as knee pads, thigh pads, kidney pads, etc. Helmets, whether used by football players, lacrosse players, jet pilots, acrobats, boxers or construction workers, all require the same degree of strength, impact absorption, and ability to recover from repeated impacts, in order to provide a practical and serviceable device. Impact-absorbing material is also used in various safety areas, for example, in the automotive area for the padding of dashboards, interiors of doors and seat backs and the ceilings of automobiles. Impact absorbent materials find significant application as packing materials, especially for fragile scientific and measuring devices.

The generally irregular shapes of the various devices utilized in the impact-absorbing field, based on the need, e.g., to conform to either portions of the human body or to the irregular shapes of automobile surfaces, have made the production of these devices rather cumbersome, inefficient, and difficult to adjust to the exigencies of modern high-speed assembly line production, without some compromise with regard to efficiency or closeness of fit. Generally, for example, in the athletic equipment field, the various pads, helmets or other accoutrements are often handmade, without the economic advantage of high-speed molding equipment. The portions of the padding or helmets, for example, are often hand cut, and then adhered together, using an adhesive which is effective for the particular materials utilized. Generally, protective athletic padding requires a relatively stiff, form-retaining portion to which is laminated, as by an adhesive, to at least one side thereof, an impact-absorbing, generally cellular polymeric material, commonly known as a "foam".

U.S. Pat. No. 3,816,234, describes one such impact-absorbing medium formed of a foam to which is adhesively connected outer layers for providing backing and a desirable surface finish. The foam is described as being a polyolefin, having a finishing layer which can be a cross-linked polyethylene ionomeric foam and a stiff self-supporting backing layer, such as a reinforced polyester or epoxy resin. The foam is sandwiched between the backing layer and the ionomeric finishing layer.

U.S. Pat. No. 3,979,540, suggests the fusing together of a layer of an ionomer foam to a flexible ionomer sheet or film, to provide a desirable roof feature for automobiles. The foam is fused to an upper film of the same ionomer and the entire laminate is then heat-formed into a shape which fits the roof of an automobile. Also see, U.S. Pat. No. 3,616,029, which describes fusing together two flat pads of foam.

The art, however, has heretofore not been able to provide an efficient procedure for the formation of irregularly shaped, self-supporting, self-skinned impact-absorbing media.

In accordance with the present invention, there is provided a laminated, foamed impact-absorbing formed article, having a relatively dense and impervious self-skin, which is self-supporting at ambient temperatures and of high impact absorptiveness, with relatively low weight, which is capable of being manufactured by a highly efficient, readily automated process. More particularly, the product of the present invention comprises a relatively stiff, self-supporting, support sheet having two opposing major surfaces and at least one impact-absorbing cellular foam layer, having two opposing major surfaces, one surface of the foam layer being fused to one surface of the support sheet, and the second surface of the foam layer comprising a relatively high density, relatively moisture-impervious, self-skin, the foam and the support layer being formed of ionomer resin.

In accordance with the process of the present invention, a sheet of foamed ionomer resin, generally a closed cell, relatively flexible sheet or layer, is placed in contact with a relatively stiff, self-supporting, sheet of ionomer resin to form a moldable, fusible combination, and the moldable combination is then heated so as to fuse together the self-supporting sheet and foam layer and to conform the foam layer to the sheet. The temperature during heat forming and the time during which the moldable combination is maintained at the thermoforming temperature, and the degree of pressure exerted on the surfaces of the foam, are such that the ratio of the overall density of the final fused and formed laminate combination-to-the overall density of the initial moldable combination, is less than about 1.4:1.

Preferably, the self-supporting sheet and the foam are fused together and simultaneously formed to the desired shape. However, under certain conditions, e.g., where the self-supporting core sheet is thick and rigid and/or is to be formed into a complex shape, requiring during forming too high a temperature or too great a pressure for the integrity of the foam layer, the core sheet can be formed to the desired shape separately, as by injection molding; the relatively flexible foam layers can then be draped over the surface of the formed core, and heated to fuse the foam layer to the core.

Little or no pressure, other than its own weight, need be applied to the foam layer to have it conform to most core shapes, especially upon being heated to the fusion or softening temperature. For complex core shapes, or for relatively thick or less flexible foam layers, a mold form can be used to insure close overall contact between the core and foam layer. However, minimal molding pressure should be utilized in order to avoid permanently compressing the foam, i.e., increasing foam density, unless such compression is desired. It has been found that the foam is not uniformly compressed along its cross-section. Rather, the thickness of the skin increases at a far more rapid rate with increasing pressure than does the overall density. Accordingly, this property can be profitably utilized where it is desirable to have a relatively thick abrasion-resistant skin on the foam. The thickness of the skin can be increased by increasing the pressure applied to the laminate during fusing and forming and holding the pressure until the foam is cooled to below the softening temperature after the product has been fully formed to the desired shape and the foam fused to the core.

The product formed in accordance with the present invention has a desirable, pleasant, resilient feel and touch, on the exposed foam self-skin surface. In addition, surface texture and design can be determined by the particular mold surface utilized. The self-skin on the foam is substantially non-porous and of relatively high density compared to the major portion of the foam layer. The thickness and density of the skin is determined by the desired abrasion resistance and other properties.

Preferably, a layer of foam is fused to both opposing surfaces of the supporting sheet, so as to provide impact absorbency on both sides of the device, thus, for example, in the athletic protective padding, providing protection to both the wearer of the padding and to any other individuals coming into contact with that portion of the wearer's body, e.g., especially for football shoulder pads.

The procedure of forming the three-layer sandwich, i.e., wherein the foam is applied to both major surfaces of the supporting sheet, is substantially the same as the procedure for the single foam layer, except that, of course, the foam is placed on both sides of the sheet and the temperature of thermoforming, the mold used, and the time of thermoforming, must be so adjusted to conform to the bulkier composite. Each foam layer is preferably at least about 0.8 mm. thick, and most preferably at least about 2.5 mm. in thickness.

Each layer of the laminate, i.e., the supporting sheet and each of the foam layers, can itself be a composite or a laminate. The foam layers can be a horizontal laminate, i.e., wherein the plies of the foam are aligned substantially parallel to the alignment of the supporting layer and overall laminate. Alternatively, the foam laminae can be aligned transversely to the alignment of the supporting sheet and overall laminate, as is more fully and completely described in applicant's U.S. Application Ser. No. 863,849 filed Dec. 23, 1977, copending herewith. The applicable portions of the aforesaid copending application directed to the formation of a transversely aligned foamed layer laminate is herein incorporated by reference.

The ionomer resin used in the preparation of either the supporting sheet or the foam can be of the type well known in the art. The foam layer can be prepared by conventional foaming techniques, also well known in the art, such as utilizing gas injection or a blowing agent. The preferred commercial procedure involves the utilization of a blowing agent such as a fluorocarbon, e.g., Freon. The foam is preferably of a closed cell structure, wherein each cell is preferably of about 5 to about 20 mils in diameter. The foam preferably has an overall density of from about 2 to about 20 pounds per cubic foot. The ionomer resin is generally a copolymer of an alpha-olefin, having from about 3 to about 10 carbon atoms, and an alpha, beta-ethylenically unsaturated carboxylic acid having one or two carboxylic acid groups, and at least one metal ion having an ionic valence of from 1 to 3 inclusive. Most commonly available, are ionomers of ethylene and methacrylic acid having 10 to about 60 percent of the carboxylic acid groups ionized with zinc or sodium ions. Typical examples of these ionomer resins are as follows:

88% by weight ethylene/12% by weight methacrylic acid copolymer having 46% of the acid groups ionized with zinc ions, and containing 12% by weight zinc;

90% by weight ethylene/10% by weight methacrylic acid copolymer having 71% of the acid groups ionized with zinc ions, such that the resin contains 10% by weight zinc;

90% by weight ethylene/10% by weight methacrylic acid copolymer having 50% of the acid groups ionized with sodium ions, so that the resin contains 10% by weight sodium;

91% by weight ethylene/9% by weight methacrylic acid, having 18% of the acid groups ionized with zinc ions.

The various ionomer resins can be prepared according to the procedure set forth in U.S. Pat. No. 3,264,272. It is well known that the physical properties of the ionomer resins vary with the chemical composition, to a certain extent, and that the proportion of carboxylic acid and the amount and type of metal ions present in the ionomer are especially effective with regard to physical properties. These ionomers are thermoplastic resins.

The structural properties of the laminate are also affected by the relative thickness of the various layers and, also, as explained above, by the nature of each layer, whether each layer is a solid member or is itself a laminate. Laminates can also be varied in their structural properties by the direction of the laminate, i.e., transverse or parallel, and further by the orientation of oriented polymer sheets. Cell size of foam is also important.

The self-supporting relatively stiff sheet can be formed of the same or different ionomer resin. It is only important that the sheet and the foam layer, or layers, be cohesive, as by thermal fusion, without requiring the presence of an intermediate adhesive material. The supporting sheet must be of sufficient stiffness to be self-supporting, when alone and when laminated to the foam layer, regardless of the shape into which it is formed. The supporting sheet is preferably from about 0.5 to about 15 mm. in thickness and most preferably, from about 1 to about 5 mm. in thickness. Thicker sheets can be utilized, if desirable.

The laminated structure in accordance with the present invention having a characteristic dense skin structure is generally produced by subjecting a sandwich formed of at least one supporting core sheet and one ionomer foam layer to a heat treatment involving the raising of the temperature of the resin to above its softening point, preferably with some pressure exerted on the foam surface for a suitable period of time. Pressure is required only where, as explained above, a complex core shape is involved or where it is desired to increase the thickness of the self-skin. If a thicker skin is not desired, the pressure should be released after the desired fusing and forming of the shaped laminate, but before cooling to below the softening point. Conversely, if a thicker skin is desired, the pressure should be maintained until after such cooling.

Furthermore, higher pressure can be selectively applied to selected portions of the surface only, to achieve specific desired results, such as variations in thickness over the surface. Even more specifically, a narrow portion can be compressed greatly, both the foam and the core, extending across an entire dimension of the laminate; this provides a hinged area if the core sheet is thinned out sufficiently to become flexible. A suitable schedule of pressure, temperature and time of treatment varies not only in accordance with the manner in which the treatment is carried out but to some degree at least to the chemical nature of the particular ionomer resin being treated, and to the thickness of the respective layers being treated and ultimately desired.

The present invention is not directly concerned with the chemistry of the ionomer resins forming the product of the present invention. There has been a fair amount of literature, including patents, dealing with the chemical nature of ionomers and the methods of manufacturing both sheet forms and foamed ionomer on a commercial level. It is not possible to specify with sufficient definiteness the necessary parameters for treating all types of ionomer resins, that are now known or which will be developed in the future. However, those skilled in the art will have no difficulty in making the necessary modifications to the treatment parameters, including temperature, time and to a certain degree pressure, that may be necessary or desirable in treating any particular ionomer resin to which the invention is to be applied.

Generally, the process in accordance with the present invention can be carried out at temperatures at or above about 190° F. (88° C.), the exact value depending upon the softening temperatures of the particular ionomer resin used and whether the core sheet is being formed or only the foam is being conformed to a pre-formed core sheet. For presently available ionomer resins, it is preferred not to treat the laminate at temperatures above about 240° F. (115° C.) and most preferably in the range of from 200° F. (93° C.) to about 215° F. (102° C.).

The moldable, fusible combination needs to be maintained at or above the laminating temperature only for a relatively short period of time in order to fuse the foam layers to the core sheet. Where it is also necessary to mold or form the core sheet to the desired shape, generally a longer period is required at the softening temperature. Generally, as little as 1 second can be sufficient to fuse and shape the foam layers to a pre-formed core, extended periods, even as long as 1 hour, are needed to fuse the foam to and form a relatively thick core sheet in a single step process of this invention. Ordinarily, 15 minutes at the fusion temperature should be ample for the single-step forming/fusing process, and optimally, for relatively thin fusible combinations, 5 minutes should be sufficient. It should be understood, that the shorter the treatment time, the more efficient is the process, as long as the treatment temperatures are not raised to a level at which the structure of the foam, or the chemical integrity of the resin, is damaged.

Pressure has been found to be perhaps the least significant variable, as the pressure utilized can be as low as, for example, 0.01 pounds per square inch, and only enough is required to form the desired shape. Indeed, it is preferred, that excessive pressure not be applied, in order to avoid too great an increase in the overall density of the foam layers or rupture of the cell walls of the foam. For example, pressures in the range of from about 0.2 p.s.i. up to about 20 p.s.i. can preferably be utilized, but most preferably pressures of not more than about 10 p.s.i. should be used. Indeed, it has been found that it is only necessary to place a pre-heated foam and core sheet sandwich in a desired mold form, and closing, without the initial application of any pressure, as long as the surfaces of the sandwich are in contact with the mold surfaces. The mere application of heat, for a time sufficient to insure an overall increase in the temperature of the sandwich such that the interfacial surfaces between the sheet and the foam layers are heated to a temperature sufficient to permit the thermal fusing of the layers, is adequate and the foam can conform itself to the core shape merely from its own weight.

If it is desired to form a thick skin, or increase the thickness of the self-skin in the flat foam layer, the fusible combination is subjected to pressure when being fused and molded to the core and the mold pressure maintained while cooling the fused and formed laminate to below its softening point in order to set the foam in the thickened skin condition. The pressure can be applied, if desired, sufficient to increase the overall density in an almost continuous manner up to the bulk density of the resin, i.e., completely destroying the foam. At any intermediate value of pressure and density, the density is set by maintaining the pressure while cooling to below the softening temperature. Furthermore, it has been found that at lower pressures and higher temperatures, the overall density can be decreased because of the natural expansion of the foam.

It is preferred that the foam layers completely surround the relatively stiff support core or sheet, even extending out beyond the edges of the support sheet along its sides.

The various features and advantages of the present invention will become more apparent from the accompanying drawings and the following verbal descriptions of preferred embodiments of the present invention. The descriptions and drawings, and the following examples are given to show merely preferred examples of the present invention and are not intended to be exclusive of the scope thereof:

Figure 1:
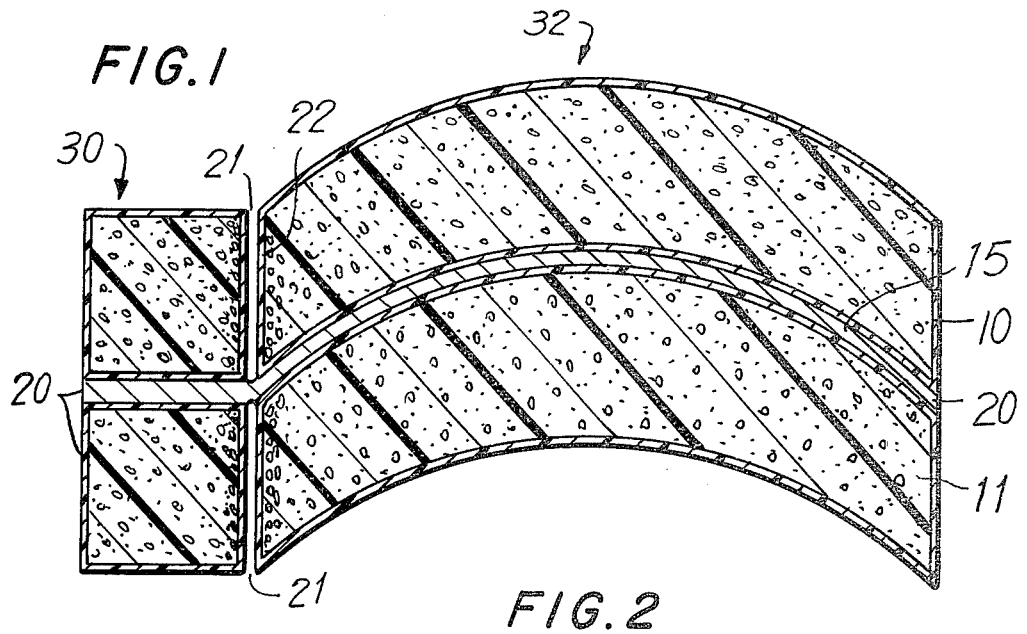
FIG. 1 is a cross-sectional view of a laminated structure in accordance with the present invention.

In the example of FIG. 1, an upper and lower foam layer 10, 11, respectively, are thermally fused to an intermediate self-supporting, relatively stiff, core 15, to form a hinged two-part element comprising a straight portion and curved portion, designated by the numerals 30 and 32, respectively. The hinge portion 21 comprises an area where the foam layers 10, 11 have been completely compressed and even the core 15 has been thinned out to render it more flexible. A substantially relatively more dense self-skin 20 is formed on all exposed surfaces of the foam layers 10, 11, including the concave surfaces 22 extending towards the hinged joint area 21. Further, as shown the foam layers 10, 11 extend out beyond the core sheet 15 so as to completely enclose the core sheet with at least the relatively dense self-skin layer 20.

Figure 2:
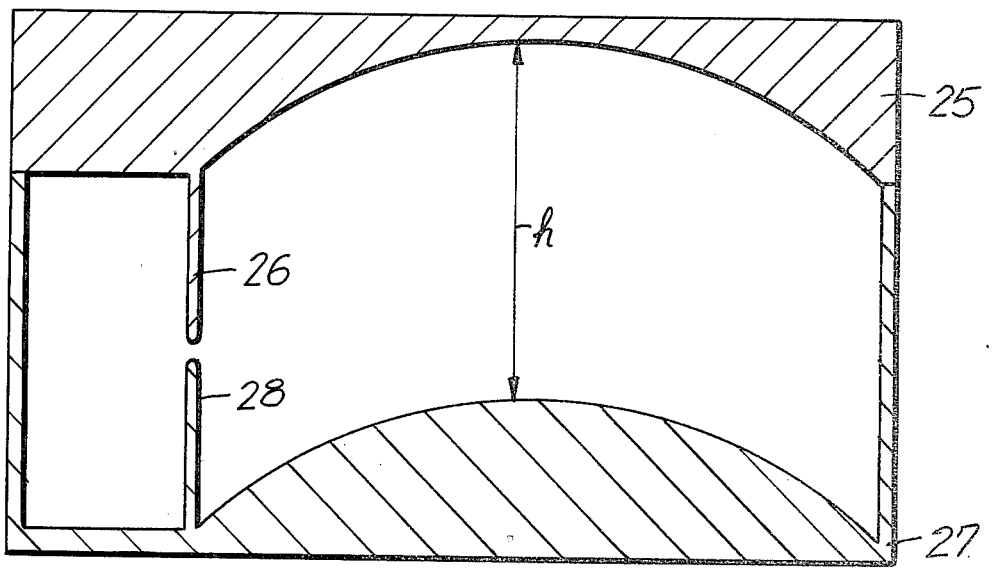
FIG. 2 is a cross-sectional view of a mold form of a type suitable for forming the laminate of FIG. 1.

The mold form of FIG. 2 conforms substantially to the curvilinear shape of the laminate of FIG. 1. The mold form as shown completely encloses the flat sandwich from which the laminate was formed, and the upper half 25 and lower half 27 of the mold form can be clamped shut by clamping means not shown. The entire mold can then be placed within an oven and heated to the desired forming temperature, wherein the relatively stiff core sheet is permanently bent to conform to the shape of the mold, the foam layers are thermally fused to the opposing surfaces of the core sheet 15 and the self-skin 20 is formed on all surfaces of the foam layers 10, 11 in contact with the mold surface. The hinged joint area of the laminate of FIG. 1 is formed by the convex portions 26, 28 of the two mold halves 25, 27.

Figure 3:
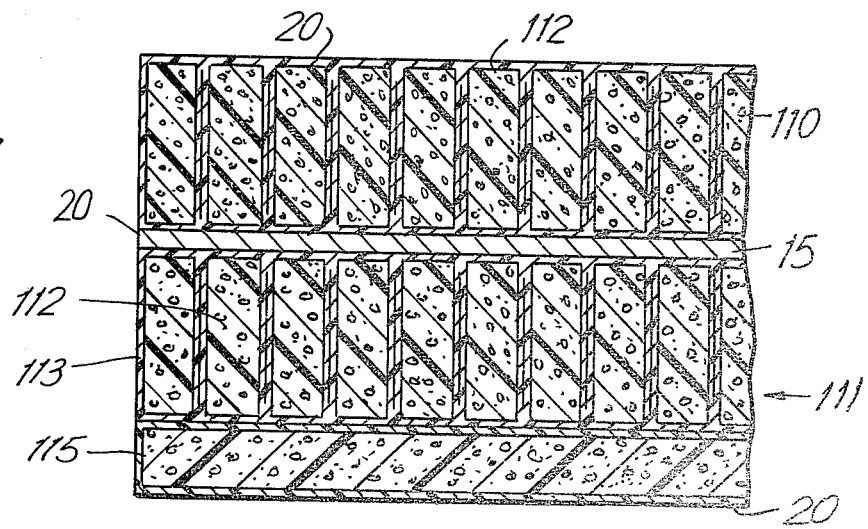
FIG. 3 is a second preferred embodiment of a laminate according to the present invention.

The embodiment of FIG. 3, is substantially the same as FIG. 1, except that each foam layer 110, 111, in the laminated structure, is itself a laminate: layer 111 of the double transverse type and layer 110 of the transverse type. Transverse foam laminates 110 and 113, as shown, are formed of transverse plies 112. Foam laminate 115 is formed of transverse plies extending perpendicularly to the plies of layers 113 and 110. This provides improved directional, or oriented, structural strength, in accordance with the explanation set forth in copending application Ser. No. 863,849.

The following working examples provide exemplary parameters for forming the laminate of the present invention, including desirable parameters for the process of thermoforming the laminate.

EXAMPLE 1

Two layers of ionomer foam*, each ¼ inch in thickness and having a major surface dimension of 10 inches × 5 inches, are sandwiched about a relatively stiff ionomer resin sheet, 1/16 inch thick, of slightly smaller major surface dimensions, such that the foam layers extend beyond the resin sheet on all four sides. The foam layers and the resin sheet are all made of an ionomer resin commercially available under the trademark designation SURLYN 1801.** The relatively stiff resin sheet has a tensile strength of about 4,000 p.s.i. (280 Kg/cm$^2$), and a flexural elastic modulus of about 0.3 × 10$^5$ p.s.i. (2109 Kg/cm$^2$). The foam layers each have a density of 3 lbs./cu. ft., (48 Kg/m$^3$); a compression modulus of 22.4 p.s.i. (1.6 Kg/cm$^2$); and a compression strength at 10% deflection of 2 p.s.i. (0.14 Kg/cm$^2$), (ASTM-D1621), a compressive load at 25% deflection after 1 minute of 5.44 p.s.i. (0.38 Kg/cm$^2$) (ASTM-D1565), and a Bashore resilience value, of 51% rebound (ASTM-D1564R).

\* Softlite foam, sold by The Gilman Corporation.
\*\* Sold by E. I. duPont de Nemours & Co.

The sandwich is heated to a temperature of about 212° F. (100° C.) and placed within a mold form having a curvilinear cross-section similar to that of FIG. 2 in the drawings, and draped so as to conform with the lower interior surface of the mold, abutting against the side surfaces of the mold as well. The upper mold form, also generally similar to that in FIG. 2, is then placed above the upper foam layer and pressed down to accurately conform the sandwich to the shape of the mold. The height of the mold space (h) when the mold is closed is 9/16 in. The mold halves are held together while the entire mold is maintained at a constant temperature of 248° F. (120° C.) for approximately 5 minutes and then removed from the oven. Upon cooling, the mold halves are separated and a laminated, formed material having a similar curvilinear cross-section to that of FIG. 1 is obtained. The outer foam surfaces of the laminate have a tough self-skin which is resistant to abrasion and scratching and substantially nonporous to moisture vapor, but highly impact absorbent.

The molded laminate as prepared by this invention can be utilized, for example, as protective athletic padding for football players, generally conforming to the shape of knee and shin guards.

EXAMPLE 2

The molding procedure of Example 1 is repeated except that in this case each of the two layers of ionomer foam is itself a laminate, of the transverse/parallel type, and is prepared as follows:

Sheets of SOFTLITE Type 300 ionomer foam, having a thickness of 0.3 cm. and an overall density of 3 lbs./ft.$^3$, and having a cellular core and a self-skin on both the upper and lower major surfaces, are horizontally super-imposed to form a vertical stack 27 cm. in height. A horizontal grid of longitudinally extending resistance wires, spaced along substantially the same plane at a distance of approximately 2 cm., and heated by electricity to a temperature of approximately 250° C., is advanced vertically downwardly through the stack of foam at a rate of approximately 3 cm. per minute, so as to slice the stack into individual slabs approximately 27 cms. in length while simultaneously fusing together the ends of the adjacent self-skins of each sheet within the stack. Thus, a plurality of transversely laminated sheets, wherein the edges of each ply in each sheet are fused together, are prepared.

Two such transverse laminations are applied on either side of an ionomer resin sheet in accordance with the procedure of Example 1, such that each foam layer, i.e., above and below the resin sheet, respectively, is formed of two plies of the transverse lamination; the two plies are perpendicularly aligned, i.e., such that the transverse laminae in one ply are aligned at 90° to the laminae in the adjacent foam ply. This foam/resin sheet/foam sandwich is then placed into a mold in accordance with the procedure of Example 1, and thermoformed so as to result in a thermoformed sheet having substantially the same shape as that in Example 1, but which is found to be significantly stronger and more shock absorbent. (See FIG. 3.)

Although in accordance with the most preferred embodiment of the present invention, the relatively stiff, supporting core sheet is a non-cellular resin sheet, if it is, or becomes, possible to form a foam sheet having the desirable relatively stiff, self-supporting characteristics, at the desired thickness, the core portion can also be formed of such a relatively stiff cellular material.

EXAMPLE 3

In preparing a highly complex shaped impact absorbing device, such as a football helmet, the following procedure can be followed:

A relatively rigid support core, having the desired shape of a football helmet, is formed by injection molding utilizing a SURLYN A ionomer resin, Type 1801,** to form a helmet core having an average overall thickness of 1 cm. Compound foam laminate layers, as described in Example 2 above, are placed about the exterior and within the interior of the helmet core, placed upon a mold having a convex and concave portion of the desired shape, and placed into an oven, where the mold and fusible sandwich combination are heated to a temperature of 230° F. (109° C.) and the mold maintained in the closed condition for 5 minutes, until the foam layers are formed to the desired shape and substantially completely fused overall to the rigid core. The mold is removed from the oven and permitted to cool until the exterior portions of the foam have cooled to below 190° F. (88° C.), i.e., below the softening temperature, and the mold then released. A helmet suitable for use in the playing of football, for example, is thus provided wherein the exterior as well as the interior of the helmet is padded with a relatively strong, abrasion-resistant, self-skinned foam for the protection of both the wearer and other players. A relatively thick skin is thus provided by maintaining the molded product under the molding pressure until cooling.

\*\* Ibid.

Further tailoring of the helmet can be obtained by utilizing a lower density foam on the interior of the helmet, thus providing a softer interior, and a higher density, harder, but more abrasion-resistant foam for the exterior surface.

The patentable embodiments of this invention which are claimed are as follows:

1. A formed impact-absorbing article comprising a relatively stiff, self-supporting, support core having two opposing major surfaces, and at least one impact-absorbing cellular layer, having two opposing major surfaces, one surface of the foam layer being fused to one surface of the support sheet, and the second major surface of the foam layer comprising a relatively high density, relatively impervious, self-skin, the foam layer and the support sheet being formed of ionomer resin.

2. The article of claim 1, comprising in addition, a second foam layer having first and second major opposing surfaces, the first major surface of the second foam layer being fused to the second major surface of the support sheet, and the second major surface of the second foam layer comprising a relatively high density, relatively impervious, self-skin.

3. The article of claim 2 having a cross-section of varying thickness.

4. The article of claim 3, comprising a relatively thin, flexible portion longitudinally extending completely across one major surface of the article so as to divide the article into two segments, whereby the two segments are capable of pivotal flexural relative movement.

5. The article of claim 2, wherein the first and second foam layers are of different thickness.

6. The article of claim 1, wherein the support core and the foam layers are all formed of the identical ionomer resin.

7. The article of claim 2, wherein one cellular foam layer is itself a laminate comprising at least two plies.

8. The article of claim 7, wherein at least one ply of at least one of the foam layers is a transverse laminate.

9. The article of claim 8, wherein at least one layer comprises at least two transverse laminates, and wherein each transverse laminate is aligned in a direction perpendicular to the alignment of the adjacent transverse laminate.

10. The article of claim 8, wherein each transverse laminate comprises intermediate transverse self-skin layers between transverse laminae, and the outer transverse ply comprises in addition an outer self-skin, on its outer major surface.

11. A process for forming an impact-absorbing laminated article, the process comprising placing one major surface of a relatively stiff, self-supporting core formed of an ionomer resin in contact with a major surface of a cellular foam layer formed of an ionomer resin, to form a moldable combination, heating the moldable combination above the softening temperature of the ionomer and forming the outer surface of the foam layer by pressing against a molding surface, and maintaining the moldable combination at the forming temperature and in contact with the molding surface for a time sufficient to fuse the core and the foam layer together such that the foam layer conforms to the surface of the core, and such that the article surface has the desired conformation.

12. The process of claim 11, wherein the core is initially substantially at the desired conformation and the foam layer is a substantially flat sheet which is fused to conform to the surface of the core.

13. The process of claim 12, wherein the foam layer is maintained pressed against the mold surface until after the foam layer is cooled to below the softening temperature, whereby a thicker and stronger self-skin is formed.

14. The process of claim 11, wherein the relatively stiff core and the cellular foam layer are initially substantially flat, and are held against a thermoforming surface while the moldable combination is maintained at above the softening temperature, whereby a one-step molding process is accomplished to permanently form the combination to the shape of the molding surface after the combination is cooled to ambient temperature.

15. The process of claim 14, wherein the overall density of the molded laminate is less than about 25 percent greater than the overall density of the unmolded core and foam layers.

16. The process of claim 15, wherein the moldable combination is maintained at the forming temperature for a period of at least about 30 seconds.

17. The process of claim 16, wherein the temperature is in the range of from about 90° C. to about 130° C.

18. The process of claim 16, wherein a cellular foam layer is comprised of at least two foam plies.

19. The process of claim 18, wherein each ply of a foam layer is a transverse laminate.

20. The process of claim 19, wherein each transverse laminate is aligned in a direction perpendicular to the alignment of the adjacent foam ply.

21. The process of claim 12, comprising in addition placing a major surface of a second cellular sheet of ionomer resin in contact with the second opposing major surface of the relatively stiff, self-supporting core, the two foam sheets extending beyond the entire perimeter of the supporting core, whereby the outer perimeters of the two foam sheets in the impact-absorbing laminate are fused together to enclose the supporting core.

22. The article of claim 1, wherein the core is at least 1 mm. in thickness.

* * * * *